United States Patent Office 3,579,553
Patented May 18, 1971

3,579,553
PHENYLMERCURY COMPOUNDS
John R. Leebrick, Old Lyme, Conn., assignor to Cosan Chemical Corporation, Clifton, N.J.
No Drawing. Filed Aug. 21, 1968, Ser. No. 754,490
Int. Cl. C07f 3/12
U.S. Cl. 260—434                    5 Claims

ABSTRACT OF THE DISCLOSURE

Novel compounds are provided of the formula

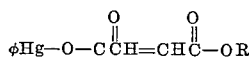

wherein R is an aliphatic or cyclic alkyl radical, aralkyl radical or aliphatic alkenyl radical. These compounds are useful as catalysts for making polyurethanes, and also act antimicrobially in the polyurethanes, and as antimicrobial agents for coating compositions, including common and marine paints and coatings, and for turf and seeds and as marine antifouling agents and as preservatives. The term "antimicrobial" as employed herein includes "cidal" and static control of bacteria, yeasts, fungi and the like.

This invention relates to novel organomercury compounds of the formula

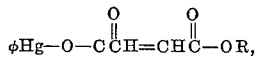

wherein R is an aliphatic or cyclic alkyl radical, aralkyl radical or aliphatic alkenyl radical, to the method of preparing these compounds and to applications for these compounds.

According to the invention, it has been found that organomercury compounds of the foregoing formula are useful in many ways, for example as catalysts for making polyurethanes, and also to act as antimicrobial agents in the polyurethanes, and as antimicrobial agents for coating compositions, including common and marine paints and coatings, and for turf and seeds and as marine antifouling agents and as preservatives and may be prepared by reacting a maleic acid half-ester of the formula

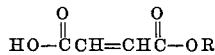

wherein R is as hereinabove defined, with phenylmercuric hydroxide or acetate.

When R is an aliphatic alkyl radical, it is preferred that such radical be of 1 to 18 carbon atoms, such as methyl, ethyl, propyl, isopropyl, butyl, amyl, hexyl, 2-ethylhexyl, n-octyl, decyl, lauryl, octadecyl and the like.

When R is a cyclic alkyl radical, it is preferred that such radical be of 5 or 6 carbon atoms, particularly cyclopentyl or cyclohexyl.

When R is an aralkyl radical, it is preferred that such radical be a phenyl-substituted alkyl radical in which the alkyl group contains from 1 to 8 carbon atoms. The most preferred radicals of this type are benzyl and β-phenylethyl.

When R is an aliphatic alkenyl radical, it is preferred that such radical be of 3 to 8 carbon atoms and most preferred that it be α-allyl.

Preparation of the half-esters from which the compounds of the invention are prepared may be carried out, for example, by forming a reaction mixture of approximately equimolar proportions of maleic anhydride and an alcohol ROH, R being as hereinabove defined, heating the mixture at 60° C. until the anhydride is molten and then heating the mixture at 90° C. for 30 minutes to one hour to complete half-ester formation or the entire heating may be at the higher temperature.

To prepare the compounds of the invention a reaction mixture of the half-ester with phenylmercuric hydroxide or acetate in approximately equimolar proportions is formed and the reaction mixture is heated to a temperature in the range of about 60 to 130° C., if desired while subjecting the mixture to vacuum to aid in the removal of by-product water when the phenylmercuric reactant is the hydroxide or by-product acetic acid when the phenylmercuric reactant is the acetate, until the reaction terminates, generally requiring a period of time of from about 30 minutes to about 1 hour.

The compounds of the invention are found to catalyze the conventional reaction of polyols with polyisocyanates to form polyurethanes. Moreover, the compounds are found to have antimicrobial activities. Thus, when employed to aid in the preparation of polyurethanes, the compounds of the invention also demonstrate utility in the polyurethane product due to their biological activity. It is highly desirable in many applications of polyurethanes for them to be endowed with antimicrobial activity, this being important when the polyurethanes are employed as the filling in mattresses and upholstered furniture or as constituents of pipe sealant and caulking formulations, for example. For catalysis in the preparation of polyurethanes from polyisocyanates and polyols, concentrations of compounds of the invention of at least about 0.01% and preferably from about 0.01% to about 1%, by weight, based on the weight of the polyurethane formed, are employed, which concentrations also provide antimicrobial activity. Phenylmercury 2-ethylhexyl maleate is found to be an especially fast catalyst for polyurethane preparation.

Fungicidal/fungistatic, bactericidal/bacteriostatic properties are also important for coating compositions, including conventional, i.e., non-marine, and marine paints, to protect the compositions both "in can" (liquid state) and as applied (dry film). The compounds of the invention are highly effective for these purposes in coating compositions. Bactericidal/bacteriostatic properties can normally be attained at lower concentrations of the compounds than fungicidal/fungistatic properties. Such lower concentrations generally suffice for "in can" preservation of the coating composition. The proportion of the compounds to be employed depends upon the nature of the coating composition and its intended environment of use. Effective proportions are readily determinable for any particular coating composition and any particular environment by routine testing. The compounds of the invention incorporated in coatings exhibit excellent resistance to sulfide staining, sulfide staining being a problem incidental to the use of many other organomercury compounds in coating compositions.

For example, for non-marine paints, compounds of the invention are generally biologically effective at concentrations of about 0.005% by weight, based on total weight of paint and concentrations greater than about 0.2% generally are not necessary, with the upper limit beyond which it is not worthwhile using more generally being about 0.8%. Lower levels in this range provide control of bacteria and higher levels provide, additionally, effective fungicidal activity and control of yeasts. In marine paints, where damage by organisms is particularly a problem, the compounds of the invention are generally effective in the range of about 3 to about 20% based on the weight of the solids content of the paint including the compounds.

It will be appreciated that due to their biological activity, the compounds of the invention are also useful as marine antifouling agents, aside from incorporation in marine paints, and due to their antibacterial and fungicidal properties are useful in admixture with or applied to any product which requires preservative protection. In this vein, the compounds of the invention are found to be particularly effective as fungicides/fungistats, bactericides/bacteriostats for agricultural purposes, particularly as applied to seeds and turf for the protection thereof. Proportions of the compounds necessary for these purposes will vary with the nature of the seeds or the turf. Generally speaking, however a sufficient, without being wasteful, application of the compounds for seeds is in the range of about 0.0025% to about 0.02%, preferably about .005% to 0.01% by weight, based on the weight of the seeds, and for turf in the range of about 0.025 lb./acre to about 0.5 lb./acre, preferably about 0.1 lb./acre. The compounds may be applied from solution, dispersion or as a wettable powder. The invention will now be further described by reference to the following examples, which are intended to illustrate the invention without limiting it.

EXAMPLE 1

130 g. (1.0 mole) of 2-ethylhexanol and 98 g. (1.0 mole) of maleic anhydride are heated with stirring for 2 hours at 80–90° C. to form the mono-ester. 295 g. (1.0 mole) of phenylmercuric hydroxide is added slowly with stirring and with heating of the reaction mixture at 120° C. to remove by-product water. The resulting phenylmercury 2-ethylhexylmaleate slowly crystallizes on standing. It is quite soluble in mineral spirits, aromatic hydrocarbons and butyl Cellosolve.

EXAMPLE 2

13 g. (0.1 mole) of monomethyl maleate and 29.5 g. (0.1 mole) of phenylmercuric hydroxide are heated at 120° C. for one hour with thorough stirring to form phenylmercury methylmaleate.

EXAMPLE 3

15.8 g. (0.1 mole) of monoisopropylmaleate and 29.5 g. (0.1 mole) of phenylmercuric hydroxide are heated at 120° C. for one hour with thorough stirring to form phenylmercury isopropylmaleate.

EXAMPLE 4

19.8 g. (0.1 mole) of monocyclohexylmaleate and 29.5 g. (0.1 mole) of phenylmercuric hydroxide are heated with stirring at 120° C. for one hour to form phenylmercury-cyclohexylmaleate.

EXAMPLE 5

24.5 g. (0.25 mole) of maleic anhydride and 14.5 g. (0.25 mole) of allyl alcohol are charged to a reactor and heated at 90° C. for 30 minutes. 84.3 g. (0.25 mole) of phenylmercuric acetate is stirred in with heating over a period of 15 minutes and the reaction mixture is stripped in vacuo to remove by-product acetic acid. The viscous phenylmercury allylmaleate formed exhibited excellent resistance to sulfide staining when incorporated into an emulsion paint and exposed to hydrogen sulfide vapor.

EXAMPLE 6

Exactly as in Example 5, phenylmercury benzyl maleate is prepared by substituting 27 g. (0.25 mole) of benzyl alcohol for the allyl alcohol.

EXAMPLE 7

To 40 g. of Niaxtriol LG–56 (a poly(oxypropylene) tri-ol with a hydroxyl number of 56) and 3.5 g. of tolylene diisocyanate is added 0.4 g. of phenylmercury 2-ethylhexyl-maleate with thorough stirring for 30 seconds. Gelation occurs at room temperature in 3 minutes. The resulting polyurethane is tough and tack free.

EXAMPLE 8

To a conventional non-marine paint is added phenylmercury 2-ethylhexylmaleate in the proportion of 2 lbs. per 100 gallons on the paint whereby the paint has the following composition:

| | Pounds per 100 gallons |
|---|---|
| Hydroxyethyl cellulose 15,000 cps. (2.5% by weight in aqueous solution) | 30.0 |
| Water | 80.0 |
| Tamol 731, sodium salt of polymeric carboxylic acid (25% by weight in water) | 21.0 |
| Triton X–405 (octylphenoxy polyethoxy ethanol) | 3.0 |
| Ethylene glycol | 25.0 |
| Propylene glycol | 35.0 |
| Phenylmercury 2-ethylhexylmaleate | 2.0 |
| Rutile titanium oxide | 300.0 |
| Talc | 100.0 |
| Calcium carbonate | 78.1 |
| Attagel 20 (attapulgite clay, Engelhardt Minerals & Chemical Corp.) | 10.0 |
| Rhoplex AC–388 (acrylic copolymer latex, 50% by weight solids concentration) | 400.4 |
| Long oil alkyd treated with cobalt naphthenate | 31.2 |
| Tributyl phosphate | 10.0 |
| Defoamer (metal soap in mineral spirits) | 2.0 |
| NH$_4$OH (28% by weight in aqueous solution) | 2.0 |
| Water | 74.5 |

The paint is found to be preserved "in can" and the applied paint coating is found to be protected against fungi by the presence of the phenylmercury compound of the invention.

EXAMPLE 9

To a conventional marine paint is added phenylmercury methylmaleate in the proportion of 100.5 lbs. per 100 gallons of the paint whereby the paint has the following composition:

| | Pounds per 100 gallons |
|---|---|
| Titanium oxide | 159.9 |
| Aluminum silicate | 48.0 |
| Talc | 11.9 |
| Acrylic polymer* | 433.8 |
| Mineral spirits | 147.9 |
| Phenylmercury methylmaleate | 100.5 |

*40% by weight of butylmethacrylate-methylmethacrylate copolymer (Acryloid F–10) in mineral spirits.

The other compounds of the invention can be prepared, used to catalyze the formation of polyurethanes and added to paints just as illustrated above.

What is claimed is:

1. Organomercury compounds of the formula

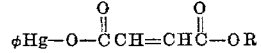

where R is selected from the group consisting of (a) alkyl radicals containing from 1 to 18 carbon atoms, (b) cycloalkyl radicals containing from 5 to 6 carbon atoms, (c) phenylsubstituted alkyl radicals in which the alkyl group contains from 1 to 8 carbon atoms, and (d) alkenyl radicals containing from 3 to 8 carbon atoms.

2. The compound according to claim 1, in which R is α-allyl.

3. The compound according to claim 1, in which R is benzyl.

4. The compound according to claim 1, in which R is β-phenylethyl.

5. The compound according to claim 1, in which R is 2-ethylhexyl.

References Cited
UNITED STATES PATENTS

| | | | |
|---|---|---|---|
| 2,112,129 | 3/1938 | Andersen | 260—434 |
| 2,118,033 | 5/1938 | Andersen | 260—434 |
| 2,139,711 | 12/1938 | Andersen | 260—434 |
| 2,157,009 | 5/1939 | Perkins | 260—434 |
| 2,177,049 | 10/1939 | Andersen | 260—434 |
| 2,692,204 | 10/1954 | Nowak | 260—434X |

TOBIAS E. LEVOW, Primary Examiner

H. M. S. SNEED, Assistant Examiner

U.S. Cl. X.R.

106—15; 260—2.5, 433; 424—291

UNITED STATES PATENT OFFICE
CERTIFICATE OF CORRECTION

Patent No. 3,579,553  Dated May 18, 1971

Inventor(s) John R. Leebrick

It is certified that error appears in the above-identified patent and that said Letters Patent are hereby corrected as shown below:

Column 1, lines 12 to 14 and lines 28 to 30, each of formulae should read as follows:

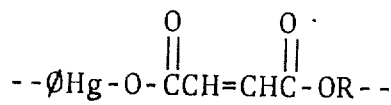

Signed and sealed this 31st day of August 1971.

(SEAL)
Attest:

EDWARD M. FLETCHER, JR.
Attesting Officer

WILLIAM E. SCHUYLER, JR.
Commissioner of Patents